United States Patent [19]

Perelle

[11] Patent Number: 5,677,613

[45] Date of Patent: Oct. 14, 1997

[54] METHOD OF REGULATING THE CHARGING OF A SET OF ELECTRICAL STORAGE CELLS, AND A FACILITY IMPLEMENTING THE METHOD

[75] Inventor: Michel Perelle, Parcay-Meslay, France

[73] Assignee: SAFT, Romainville, France

[21] Appl. No.: 656,302

[22] PCT Filed: Oct. 13, 1995

[86] PCT No.: PCT/FR95/01348

§ 371 Date: Jun. 14, 1996

§ 102(e) Date: Jun. 14, 1996

[87] PCT Pub. No.: WO96/12333

PCT Pub. Date: Apr. 25, 1996

[30] Foreign Application Priority Data

Oct. 18, 1994 [FR] France ................... 94 12421

[51] Int. Cl.⁶ .................... H01M 10/44; H01M 10/46
[52] U.S. Cl. ............................. 320/6; 320/15
[58] Field of Search ................... 320/6, 8, 9, 15, 320/17, 18; 324/434, 433; 429/149, 90

[56] References Cited

U.S. PATENT DOCUMENTS

| | | | |
|---|---|---|---|
| 4,061,955 | 12/1977 | Thomas et al. | 320/6 |
| 4,238,721 | 12/1980 | Deluca et al. | |
| 5,153,496 | 10/1992 | LaForge | 320/17 |
| 5,206,578 | 4/1993 | Nor | 320/18 X |
| 5,258,244 | 11/1993 | Hall et al. | |
| 5,387,857 | 2/1995 | Honda et al. | 320/17 X |
| 5,469,042 | 11/1995 | Rühling | 320/17 |
| 5,578,927 | 11/1996 | Perelle | 324/434 |

FOREIGN PATENT DOCUMENTS 0498679  8/1992  European Pat. Off.

OTHER PUBLICATIONS

D. Hopkins et al., "Dynamic Equalization During Charging of Serial Energy Storage Elements", *IEEE Transaction on Industry Applications*, vol. 29, No. 2, Mar. 1993, New York, US pp. 363–367.

B. Lindemark, "Individual Cell Voltage Equalizers (Ice) for Reliable Battery Performance", *13th International Telecommunications Energy Conference*, 5 Nov. 1991, Japan, pp. 196–201.

*Primary Examiner*—Edward Tso
*Attorney, Agent, or Firm*—Sughrue, Mion, Zinn, Macpeak & Seas, PLLC

[57] ABSTRACT

The method and the facility are intended for regulating the current supplied by a charger (3) to a set (1) made up of a plurality of units (2), each of which is provided with an individual interface (5) making it possible to measure voltage, to divert a portion of the charging current, when the voltage measured across the unit is greater than a threshold value, and to supply measurement signals to a controller (4) of the charger. The charging current is reduced as soon as one of the interfaces indicates that it is diverting current, and so long as the charging current supplied is greater than the sum of the currents that can be diverted by the interfaces. The charging current is then maintained at the same level until all of the interfaces indicate that they are diverting current.

7 Claims, 2 Drawing Sheets

5,677,613

METHOD OF REGULATING THE CHARGING OF A SET OF ELECTRICAL STORAGE CELLS, AND A FACILITY IMPLEMENTING THE METHOD

FIELD OF THE INVENTION

The invention relates to a method of regulating the charging of a set of electrical storage cells, and to a facility for implementing the method.

BACKGROUND OF THE INVENTION

In known manner, such a set is conventionally made up of a plurality of units, each of which is identically made up of one or more identical electrochemical cells, the units being connected together in series via their respective power supply terminals.

Charging such a set by means of a charger connected to the end terminals of the set generally does not take place uniformly for all of the units. The electrical and chemical characteristics of the units in the same set vary over time and as a function of the operating conditions of the set. This results in particular in the various units of the same set not reaching their respective fully charged levels simultaneously during recharging.

It is therefore known that a current can be maintained at the end of charging of a set comprising a plurality of units in order to ensure that all of the units are fully charged including those which are the slowest to become recharged. Unfortunately such a solution to the problem is not without its drawbacks, because the units that reach their fully charged levels first continue unnecessarily to pass the charging current which heats them up and can lead to gases being given off, or, when the units are made up of sealed cells, to excessive pressure building up.

A known solution for remedying this consists in regulating the charging current for each unit as a function of the voltage across its terminals by means of a circuit making it possible to divert a progressively increasing fraction of the current away from the unit, at the end of unit charging, once a voltage threshold representative of the end of charging is reached. However, such a solution is not entirely satisfactory for a set having a large capacity for supplying high currents, e.g. such as the sets intended for use in electrically powered vehicles. The currents required for recharging such sets can also be high, which means that the currents to be diverted are also high, and that the power dissipated for regulation purposes at the end of charging is high.

SUMMARY OF THE INVENTION

The invention therefore provides a method of regulating the current supplied by a charger to the end terminals of a set of electrical storage cells, which set is made up of a plurality of units, each of which is identically made up of one or more identical electrochemical cells, the units being connected together in series via their respective power supply terminals, each unit being provided with an individual interface including measurement means for measuring the voltage across its power supply terminals, means for diverting a portion of the charging current supplied to the unit, when the measured voltage is greater than a threshold value, and means for supplying measurement signals to a controller of the charger.

According to a characteristic of the invention, provision is made for the controller to reduce progressively the charging current supplied by the charger to the set, when a current measurement signal is received from at least one of the interfaces, which current measurement signal expresses the existence of a current diverted at the interface, so long as the charging current supplied to the set is greater than the sum of the currents that can be diverted by the interfaces, the charging current then being maintained at the same level until current measurement signals are received that express the fact that the diversion means for all of interfaces of the units of the set are operating.

The invention also provides a facility associating, at least temporarily, a charger with a set of electrical storage cells, the charger being connected to the end terminals of the set, the set being made up of a plurality of identical units, each of which comprises one or more electrochemical cells, the units being connected together in series via their respective power supply terminals. Each unit of the set is provided with an individual interface which includes means for measuring the voltage across its power supply terminals, means for diverting a portion of the charging current supplied to the cell, when the measured voltage is greater than a threshold value, and means for supplying measurement signals to a controller of the charger.

According to a characteristic of the invention, the means for supplying measurement signals from each interface transmit a current signal representative of the charging current diverted at the interface in question.

According to another characteristic of the invention, the facility includes clock means making it possible to activate successively and periodically the means for supplying measurement signals from each of the interfaces, and in that these means supply their respective current measurement signals to a common transducer serving as an interface relative to the controller of the charger.

BRIEF DESCRIPTION OF THE DRAWINGS

The invention, its characteristics and its advantages appear more clearly from the following description given with reference to the accompanying drawings, in which.

DESCRIPTION OF THE PREFERRED EMBODIMENT

Figure 1:
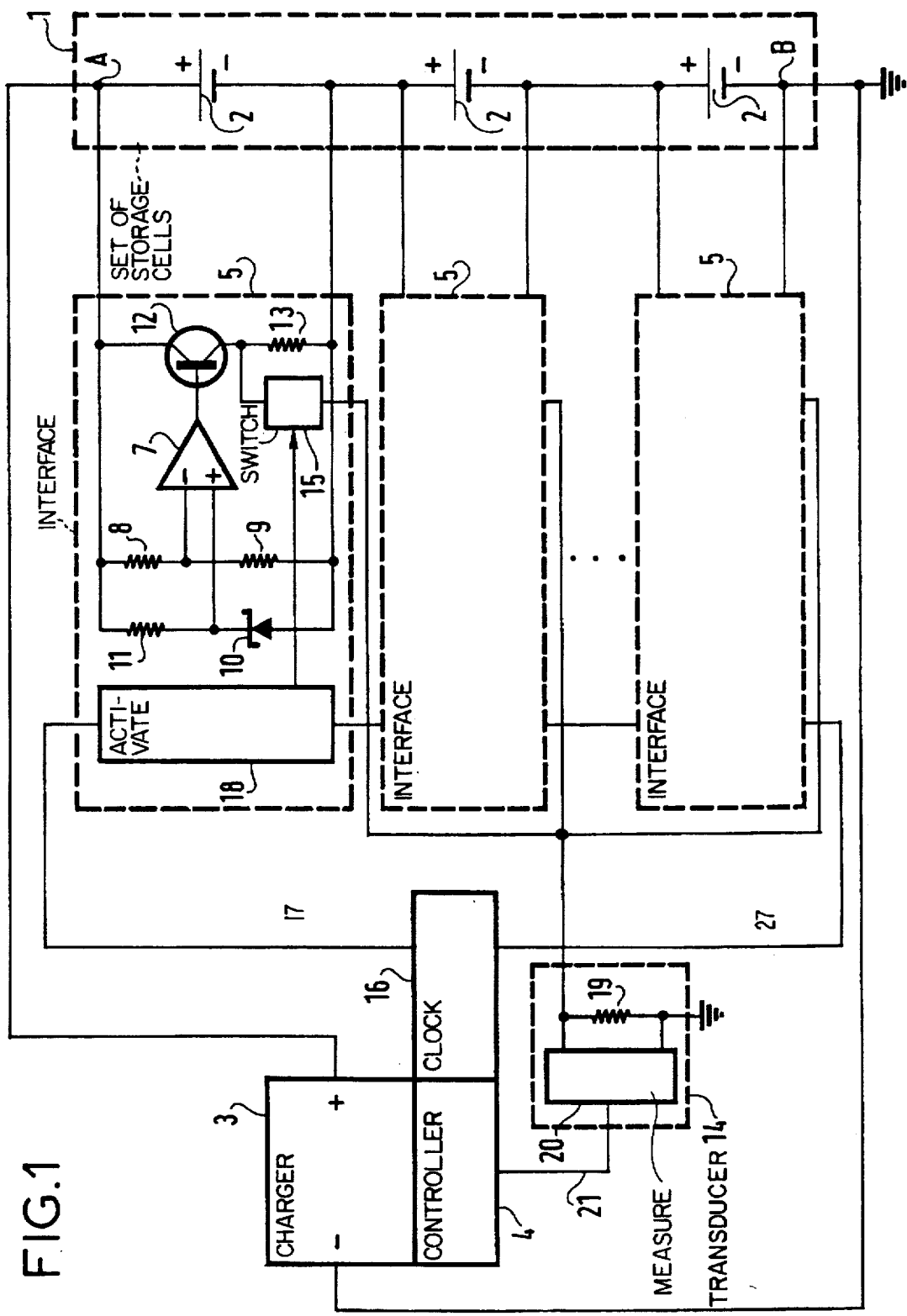
FIG. 1 is a diagram showing a charging facility of the invention for charging a set of electrical storage cells.

FIG. 1 shows a modular set 1 of electrical storage cells, which set is assumed to be made up of a plurality of identical units 2 connected together in series via their respective power supply terminals referenced "+" and "−".

All of the units are identically made up of one or more electrochemical cells which are also substantially identical.

The set 1 can be connected, at least temporarily, to a charger 3 by connecting the power supply terminals of the charger to the end terminals referenced A and B of the set. The charger may be of conventional type, and it is assumed to be provided with a controller 4 making it possible in particular to adjust the charging current I that it supplies to the set 1. For example, the controller 4 may be organized around a micro-controller (not shown) which includes input-output ports, in particular for receiving measurement signals making it possible to drive the charger as a function of the variation in the state of charge of the set, and to transmit control signals to the charger proper. These elements are known to a person skilled in the art, and they are not therefore described in any further detail herein. In the embodiment suggested, an individual interface 5 is assigned to each unit 2 of the set 1, and it is connected to the "+" and "−" power supply terminals of the unit 2 to which it is assigned.

Each interface 5 includes, in particular, means enabling it to measure the voltage V across the "+" and "−" power supply terminals of the unit 2 with which it is associated. For example, the measurement means may be constituted by a differential amplifier 7 having its inverting terminal connected to a point common to the two resistors 8 and 9 of a divider bridge connected across the "+" and "−" terminals of the unit, and having its non-inverting terminal connected to a point that is common to a Zener diode 10 and to a resistor 11 connected together in series across the above-mentioned "−" and "+" terminals, so that the output of the amplifier supplies a control signal to the base of a transistor 12 when the voltage V measured across the terminals of the unit exceeds a threshold value VS set by the diode 10.

The transistor 12, of the PNP type, is connected to the "−" terminal of the unit via its collector, and via a resistor 13, and it is connected to the "+" terminal of the unit via its emitter. It makes it possible to divert a portion of the charging current Ic supplied by the charger 3 to the unit to which it is assigned. This discharging takes place into a resistor 13 which constitutes a current-absorbing element, when the voltage obtained across the terminals of the unit exceeds the threshold value VS, which value is chosen so as to prevent the set from unnecessarily and dangerously passing a charging current I that is too high at the end of charging.

Each interface 5 also includes means enabling it to supply current measurement signals. In this example, these means supply a measurement signal i expressing the existence of a diverted current Id diverted at the interface via the transistor 12 towards the resistor 13.

In this example, the measurement signal i is a current transmitted to a measurement transducer 14 of the facility, which transducer is shown connected to the collector of the transistor 12 of each of the interfaces 5, via a connect/disconnect switch 15 for each interface. For example, the switch 15 of each interface may be periodically switched on via clock means 16 of the facility, which means may, for example, include a sequencer, in this example assumed to be associated with the controller 4 of the charger, the sequencer optionally being incorporated in the controller.

In a preferred embodiment, the sequencer successively controls the various interfaces 5, which are connected together in series via a common control link 17, by sending a stream of control pulses.

Each interface 5 includes activation means 18 known per se and triggering sending of at least one measurement signal on receiving a first control pulse after a determined minimum lapse of time. In this example, the activation means 18 are assumed to be organized in a known manner so as to take into account only the first control pulse that they receive, and then transmit any immediately following pulse(s) to the interface(s) 5 which is/are situated downstream on the link 17, and to which the pulse(s) is/are addressed.

The measurement transducer 14 receives the measurement signals successively supplied by the interfaces 5. These signals, which are in the form of current in this example, may, for example, feed a measurement resistor 19 associated with a measurement device 20, e.g. making it possible to digitize and optionally to pre-process the measurements taken prior to transmitting them to the controller 4, via a link 21.

Figure 2A:
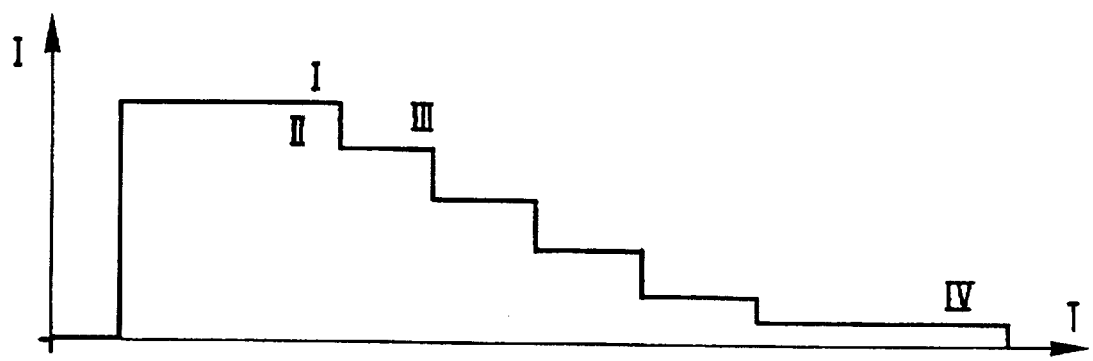
FIGS. 2A–2D show timing diagrams relating to the charging method of the invention.
Figure 2B:
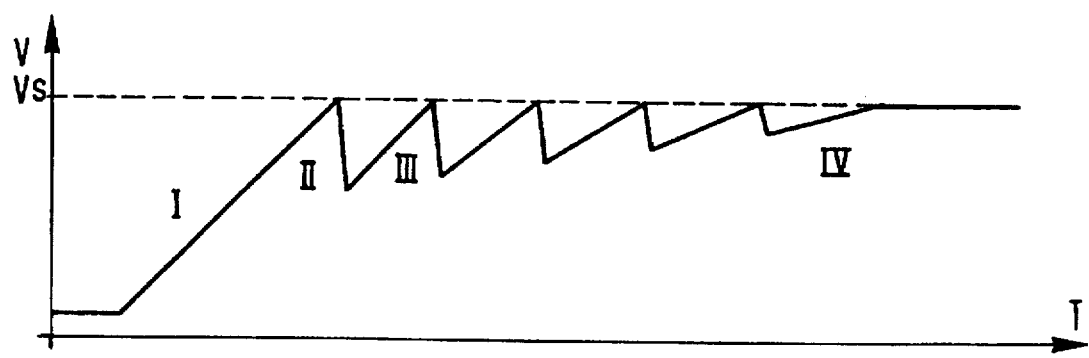

At the beginning of charging or recharging the set 1, and when the current I supplied by the charger 3 to the set 1 is at its maximum, as shown by portion I of the FIG. 2A, the voltage across the terminals of the units increases over time, as shown for a unit in portion I of the FIG. 2B, as does the voltage across the terminals of the set.

Figure 2C:
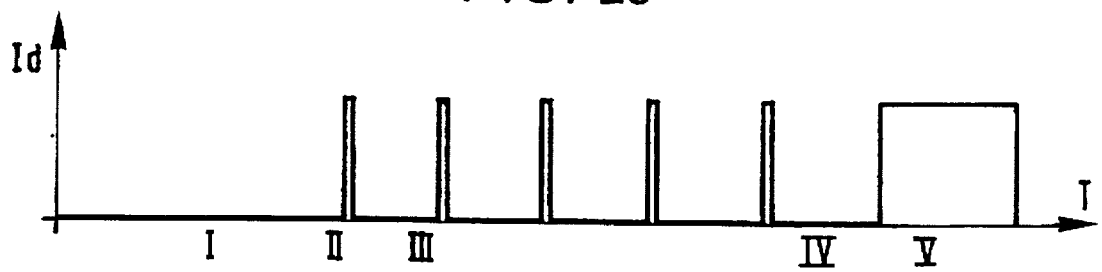

There comes a time when the voltage V across the terminals of at least one of the units 2 being charged reaches a threshold value VS beyond which a portion Id of the charging current flowing towards the unit is diverted, via the emitter-collector link of the transistor 12 and the resistor 13 of the associated interface 5 because the transistor 12 conducts, as represented in FIG. 2C.

The interface then supplies the transducer 14 with a measurement signal i which is constituted by taking current at the point that is common to the transistor 12 and to the resistor 13, the current being taken via common sampling path 27, when the switch 15 is switched on via the activation means 18 of the interface, which means are periodically triggered by the clock means of the facility 16.

Figure 2D:
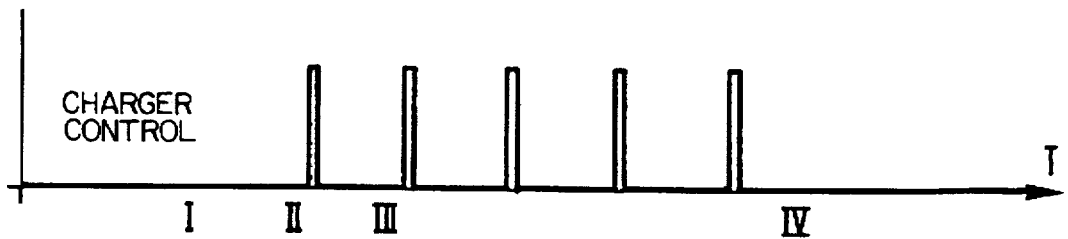

The measurement signal, which is a pulse signal in this example, is taken into account by the controller 4, optionally after having been pre-processed and digitized at the measurement device 20. A control signal, such as the one shown at level II in FIG. 2D is sent by the controller 4 to the charger 3, resulting in a reduction in the current supplied by the charger to the set 1.

The voltage across the terminals, both of the units and of the set, decreases accordingly, as shown at level II of FIG. 2B for the unit already considered.

In an embodiment, this reduction in current is stopped as soon as the measurement signals obtained from the interfaces express the fact that there is no longer any current being diverted at any of the interfaces 5 of the units of the set 1, when the respective voltages across the power supply terminals of all of the units taken individually are all below the threshold value VS.

The units then continue to be charged with a current corresponding to the current defined at the time at which the reduction is stopped. Continuing to supply the charging current I to the set 1 leads to the respective voltages across the terminals of the units 2 increasing progressively again, and to the set 1 and the charger operating as described above. This operating stage referenced III in FIGS. 2A–2D can be repeated one or more times as shown in FIGS. 2A–2D.

Towards the end of a charging or recharging operation, a reduction in the current supplied by the charger would lead to the current becoming less than a threshold value IS corresponding to the sum of the currents that can be diverted by the interfaces.

At least some of the units might then be fully charged, and they then supply a current measurement signal expressing the fact that their respective diversion means are operating. Other units still require additional charging which leads to the charger continuing to supply the current to the set, as represented in the stage referenced IV in FIGS 2A–2D, despite the presence of current measurement signals which previously resulted in another reduction in the charging current.

The controller 4 then causes the charging current I to be stopped, or optionally causes it to be reduced to a trickle-charging current that is much lower than the charging current, when all of the interfaces supply current measurement signals that are characteristic of their diversion means operating, with stopping or reducing the current in this way optionally being delayed as shown at V in FIG. 2C.

I claim:

1. A method of regulating the current supplied by a charger (3) to the end terminals of a set (1) of electrical storage cells, which set is made up of a plurality of units (2), each of which is identically made up of one or more identical electrochemical cells, the units being connected together in series via their respective power supply terminals, each unit being provided with an individual interface (5) including measurement means for measuring the voltage (V) across its power supply terminals, means (12, 13) for diverting a portion (Id) of the charging current (I) supplied to the unit, when the measured voltage is greater than a threshold value (VS), and means (15) for supplying measurement signals to a controller (4) of the charger, said method being characterized in that provision is made for the controller to reduce progressively the charging current supplied by the charger to the set, when a current measurement signal (i) is received from at least one of the interfaces, which current measurement signal expresses the existence of a current (Id) diverted at the interface, so long as the charging current (I) supplied to the set is greater than the sum of the currents (I) that can be diverted by the interfaces, after which the charging current (I) then being maintained at the same level until current measurement signals are received which indicate that the diversion means for all interfaces of the units of the set are operating.

2. A battery charger system associating, at least temporarily, a charger (3) with a set (1) of electrical storage cells, which set is made up of a plurality of identical electrochemical units (2) connected together in series via their respective power supply terminals (+, −), the charger being connected to the end terminals (A, B) of the set, each unit of the set being provided with an individual interface (5) which includes means (7 to 11) for measuring the voltage (V) across its power supply terminals, means (12, 13) for diverting a portion of the charging current supplied to the cell, when the measured voltage (V) is greater than a threshold value (VS), and means (15) for supplying measurement signals to a controller (4) of the charger, said system being characterized in that the means for supplying measurement signals from each interface transmit a current signal (i) representative of the charging current (Id) diverted at the corresponding interface.

3. A battery charger system according to claim 2, characterized in that it includes clock means (16) making it possible to activate successively and periodically the means (15) for supplying measurement signals from each of the interfaces, and in that these means supply their respective current measurement signals to a common transducer (14) serving as an interface relative to the controller (4) of the charger.

4. A method of charging a series of electrochemical storage cells in a battery connected to an adjustable charging current supply, each cell having a voltage sensor and a current diverter circuit monitored by a controller, said method comprising the steps of:

applying a charging current from the adjustable charging current supply to the battery;

diverting a portion of said current around each cell in proportion to the amount by which said corresponding cell voltage sensor detects a cell voltage that exceeds a predetermined threshold;

generating, for each cell, a current signal proportional to the amount of current being diverted (Id);

monitoring said current signals for each cell; and signalling from said controller to said charging supply to reduce the charging current whenever at least one of said monitored current signals indicates a diverted current (Id).

5. The method of claim 4 wherein the sequence of monitoring the current signals and signalling the charging current supply is repeated as long as said charging current is greater than a predetermined current, and then said charging current is maintained at the same level until current signals from every said cell indicate a current being diverted.

6. The method of claim 4 wherein the step of monitoring said current signals further comprises the step of:

sequentially activating a switch associated with each cell, where said switch temporarily connects the diverter circuit to a transducer for measuring the current being diverted around said cell.

7. The method of claim 6 wherein said step of monitoring said current signals further comprises the steps of:

sending a pulse train from said controller through an activation circuit, where said activation circuit includes, for each cell, a serially connected activation means for activating a current-sampling switch in the corresponding cell, each activation means being activated only once during each said pulse train, and measuring a signal pulse corresponding to each cell as its current-sampling switch is activated.

* * * * *